H. M. BOWLES.
AUTOMOBILE LOCK.
APPLICATION FILED DEC. 22, 1919.
1,372,597.
Patented Mar. 22, 1921.
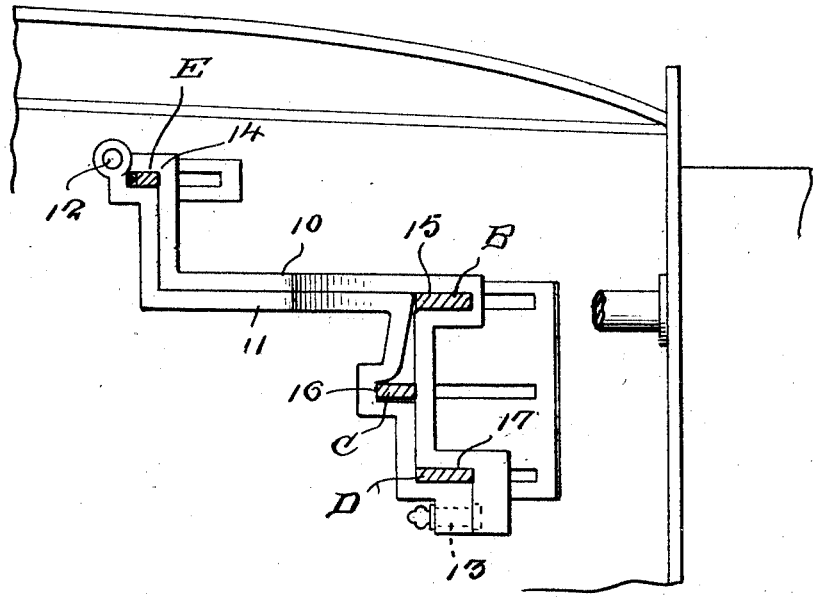
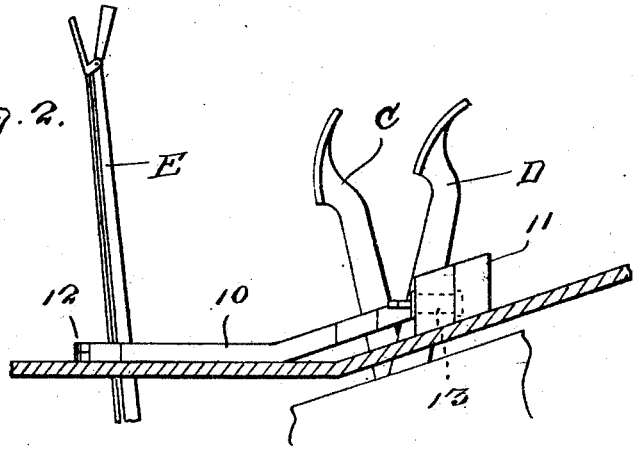
Inventor
H. M. Bowles
By Victor J. Evans
Attorney

UNITED STATES PATENT OFFICE.

HARRY M. BOWLES, OF ST. LOUIS, MISSOURI.

AUTOMOBILE-LOCK.

1,372,597. Specification of Letters Patent. Patented Mar. 22, 1921.

Application filed December 22, 1919. Serial No. 346,443.

*To all whom it may concern:*

Be it known that I, HARRY M. BOWLES, a citizen of the United States, residing at St. Louis, State of Missouri, have invented new and useful Improvements in Automobile-Locks, of which the following is a specification.

This invention relates to the theft prevention device for automobiles, and has for its object the provision of a lock adapted to engage about the three transmission control pedals and the hand or emergency lever of a very popular make of automobile whereby to hold the transmission completely locked and to hold the brakes on the rear wheels locked at the same time.

An important object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawing in which—

Figure 1 is a plan view of my device, showing it in locking position, and

Fig. 2 is a side elevation thereof.

Referring more particularly to the drawing, the letter A designates the front portion of the body of an automobile, B, C and D designates the transmission control pedals, and E designates the emergency brake lever.

In carrying out my invention I provide a pair of bars 10 and 11 which are hinged together at one end, as shown at 12, and which have their other ends adapted to be locked together by means of a barrel type lock indicated at 13. The bars 10 and 11 are of zig-zag shape so that the bars at one end will be disposed at the lever E and adjacent their other ends will be disposed at the pedals B, C and D. Adjacent the hinged connection 12 the bar 11 is offset with respect to the bar 10 to provide a recess 14 embracingly engaging the lever E. At the pedals B and C the bars are offset or bent to provide recesses 15 and 16, respectively, for the reception of the pedals B and C, and a similar formation is provided at the locking ends of the bars to form a recess 17 for engagement upon the pedal D.

In the use of the device it will be seen that when the free ends of the bars are unlocked the bars may be readily engaged upon the pedals and upon the brake lever while the pedals are in normal or inactive position, and while the emergency brake lever is in its rearmost or set position. The bars being applied, are locked by means of the barrel lock 13, whereupon it will be obvious that any attempt to move the vehicle will be impossible of accomplishment.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

An automobile lock comprising a pair of bars of zig-zag shape hingedly connected at one end and provided at their other ends with locking means, said bars lying together in contacting engagement throughout their length and being formed adjacent their pivotal connection with a recess conformingly engaging about the hand brake lever, and the other end portions of said bars being recessed for conforming engagement with the brake, reverse and clutch pedals whereby to hold all of the latter in fixed relation to one another and to the hand brake lever, the entire device being free from connection with the car and being bodily removable when unlocked.

In testimony whereof I affix my signature.

HARRY M. BOWLES.